March 5, 1968 M. S. SHEBANOW 3,371,929

RECORD PROCESSING APPARATUS

Filed July 13, 1965 5 Sheets-Sheet 1

INVENTOR
MICHAEL S. SHEBANOW
BY Fred Jacob
ATTORNEY

INVENTOR
MICHAEL S. SHEBANOW
BY Fred Jacob
ATTORNEY

March 5, 1968 M. S. SHEBANOW 3,371,929
RECORD PROCESSING APPARATUS
Filed July 13, 1965 5 Sheets-Sheet 3

INVENTOR
MICHAEL S. SHEBANOW
BY Fred Jacob
ATTORNEY

March 5, 1968 M. S. SHEBANOW 3,371,929
RECORD PROCESSING APPARATUS
Filed July 13, 1965 5 Sheets-Sheet 4

INVENTOR
MICHAEL S. SHEBANOW
BY Fred Jacob
ATTORNEY

RECORD PROCESSING APPARATUS

Filed July 13, 1965

INVENTOR
MICHAEL S. SHEBANOW
BY Fred Jacob
ATTORNEY

United States Patent Office 3,371,929

Patented Mar. 5, 1968

3,371,929

RECORD PROCESSING APPARATUS

Michael S. Shebanow, Medfield, Mass., assignor to Honeywell Inc., Minneapolis, Minn., a corporation of Delaware Filed July 13, 1965, Ser. No. 471,579
18 Claims. (Cl. 271—74)

ABSTRACT OF THE DISCLOSURE

Apparatus for returning selected record cards to their normal, randomly accessible storage location, suspended above a reference plane. The mechanism includes a plate having a plurality of holes through which vacuum pressure is applied. A selected card travels in edgewise contact with the reference plane and covers up successive holes of the plate as it arrives at the latter. The applied vacuum pressure is effective to arrest the card at a predetermined point on the plate. The plate is capable of lifting the card in a direction substantially normal to the direction of the card travel, to a position where an aperture in the plate comes into registry with card removal means. The latter is operative from the rear of the plate to return the card to its storage location in a direction substantially normal to both the direction of card travel and the direction of card lift.

The present invention relates in general to new and improved unit record processing apparatus, in particular to apparatus for reliably and rapidly transporting unit records.

While it is not so limited, the invention is applicable and will be explained with reference to specific apparatus wherein the unit records are randomly accessible and take the form of flexible cards or tape strips. In one practical embodiment of the invention, the cards include at least one surface of magnetic material on which data may be stored in the form of discrete magnetized spots located along a plurality of substantially parallel tracks. Equipment of this type is normally associated with a data processing system which is capable of operating at very high speeds. Accordingly, it is important for the individual cards to be selected rapidly from a deck or stack of cards when called for. The selected card must be transported at a predetermined speed past a processing station where the desired data transfer is carried out and must, thereafter, be quickly returned to the deck. It is necessary that these operations be carried out as rapidly as possible so that the card is again available in the deck for selection.

Prior art unit record processing equipment of the type described, has met with only moderate success, owing to the limited record processing rates heretofore attainable. The record processing cycle wherein the card is first selected from the deck, then transported past the data transfer station and subsequently returned to the deck, is relatively long in such equipment. Conventionally, the cards are suspended in their normal storage location. The chosen card is selectively dropped and must completely clear the adjacent suspended cards before the data transfer operation, during which the card is held on a read capstan, can be effected.

In such equipment, all motion of the selected card takes place in a vertical plane with the exception of two 180° reversals of motion, one of which is effected by the read capstan. In the absence of a positive controlling force exerted on the card, card positioning in a horizontal direction is imprecise in such an arrangement. The return path of the card is primarily in an upward direction, so that gravity tends to dissipate the momentum of the card. It is sometimes necessary to insert a booster to move the returning card past the peak of its return path, after which it moves in a downward direction for a brief interval. Thus, neither the time nor the position of a returning card can be precisely fixed. As a consequence, the complexity and the cost of the mechanism for returning the card to the deck, which must accommodate these variations, are materially increased, with an attendant decrease in reliability over sustained periods of high-speed operation.

Where cards having one magnetic surface are employed, account must be taken of the fact that this surface is sensitive to abrading action normally encountered by the card in its travel. Also, where the cards are suspended in a normal storage location, e.g. by means of notches in one edge of each card which engage appropriate selection rods, the notch area in particular must be protected from damage. In prior art equipment, damage to the recording surface following sustained periods of operation shows up in a marked decrease in the reliability of data readout. Damage to the notches may result in incorrect card selection, or worse, in multiple card selection and almost certain damage to the cards themselves.

In order to speed up the overall operation of the apparatus, it may be necessary to have more than one card cycling in the card path at any given time. At high operating rates this requires extremely rapid operation on the part of the card return mechanism and a predictable time of card arrival. The mechanism must be capable of quickly arresting the progress of the arriving card at a precisely predictable point, yet without damage to the card. Once arrested, the card must be accurately positioned so that the notches are in registry with the rods and must then be rapidly moved onto the rods to ready the latter for another card selection operation, or for the arrival of the subsequent card in the path. The total time interval for the action of the return mechanism may only be of the order of 80 milliseconds.

Heretofore available apparatus of the kind described, falls short in many respects of these requirements. As pointed out above, cards arrive at neither precisely predictable times nor position. The latitude required to make allowance for the expected variations necessitates lengthening the overall card transport cycle. In the process of being arrested, the arriving card in such equipment, strikes a stop or barrier with its leading edge. Damage to the card is avoided only by lowering the velocity of the returning card, thus again lengthening the overall card transport cycle. The impact further produces a certain amount of card bounce which must be allowed to settle before the relatively small card notches can be brought into registration with the rods. Here again, the transport cycle is extended. In prior art apparatus the card return mechanism is difficult or impossible to adjust in order to obtain fine control of the timing of the operation, or of the location of the arrested card. Moreover, prior art apparatus is costly and complex and hence vulnerable to mechanical breakdowns. A relatively large number of parts have individual cycles which must function in close synchronism with each other. Under these conditions, rapid operation is difficult to achieve.

It is the primary object of the present invention to provide unit record transport apparatus which is not subject to the foregoing disadvantages.

It is another object of the present invention to provide unit record transport apparatus which is capable of reliable, high-speed operation for sustained periods of time.

It is a further object of the present invention to provide card transport apparatus which is capable of rapidly returning arriving cards to their normal storage location without aggressive contact with any sensitive card areas.

It is an additional object of the present invention to provide card transport apparatus capable of controllably arresting an arriving card at a precisely determined point in time and location.

It is still another object of the present invention to provide apparatus for quickly and reliably transporting a card successively in mutually perpendicular directions.

These and other objects of the present invention, together with the features and advantages thereof, will become apparent from the following detailed specification in conjunction with the following drawings in which.

Figure 1:
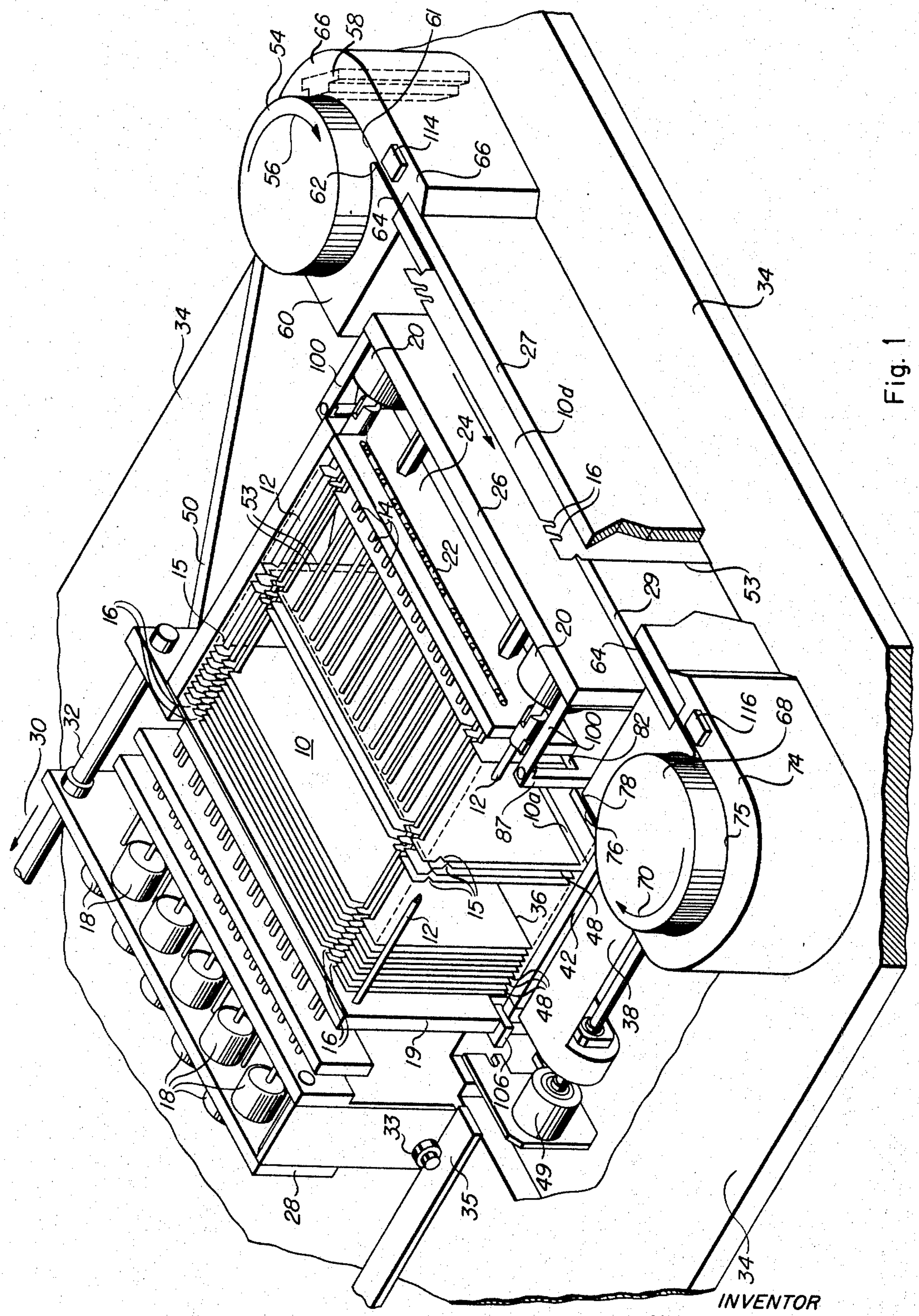
FIGURE 1 is an overall view of a card transport in which the present invention may find application.

With reference now to the drawings, a deck of unit records in the form of substantially rectangular cards or tape strips 10 is seen to be suspended on a plurality of rods. Each card preferably has one magnetizable surface which faces a plate 19 in FIGURE 1. Each card further includes a conductive coating on its other surface in order to dissipate static charges. A pair of holding rods 12 engages appropriate notches 15 in the minor card edges, i.e. in the side edges of the cards, while successive pairs of selection rods 14 engage corresponding slots 16 in the upper, or major, edge of each card. In practice, the cards 10 are distributed along the entire length of the rods, forward of the plate 19, the distribution shown in FIGURE 1 having been adopted in order to illustrate pertinent portions of the subject invention. It will also be understood that the cards are ordinarily stacked closer than can be faithfully represented in the drawings. The notches 16 are arranged in successive pairs along the entire length of the upper edge of each card, but have not been fully shown in the drawings for the sake of simplicity. The ends of the rods 14 are supported in a common slot 22. The latter is located in a support plate 24, which is itself fastened to a plate 26. The rods 14 and 12 are rotatably supported and are adapted to be turned by corresponding solenoid actuators 18 and 20 respectively.

The notches 16 preferably have one of two possible configurations, so as to uniquely define the binary address code of each card. As seen from the number of actuators 18, a 10-digit code defines each address. The cross section of each selection rod is such that in one of its two positions the rod is adapted to engage the corresponding notch 16 in supporting relationship if the notch has the proper configuration. Each holding rod and each selection rod has a relieved portion near its forward end, enabling it to accept card notches in any position of the rod. The rods 14 and 12 may be rotated out of supporting relationship with the notches upon the energization of the corresponding actuators. Thus, a card may be released at random from the rods and dropped onto the surface below, as shown at **10*a*** in FIGURE 1.

The actuators 18 are positioned on a common supporting carriage 28 which is adapted to be moved in the direction of the arrow 30 when it is desired to withdraw the rods 14 in order to replace the deck of cards 10. The requisite force is applied to the rod 32 and the movement of the carriage 28 is determined by a pair of rollers 33 and corresponding guide rails 35, positioned on opposite sides of the carriage.

The cards are normally suspended on the rods above a reference plane, which is determined by a planar working surface 34. The lower major edge 36 of the suspended cards are equally spaced from the reference plane, the cards hanging substantially normal to said plane. A plane of photocells 108 and 110 are positioned so as to monitor the space between the card edges 36 and the reference surface 34. The term photocell, as employed herein, is broadly directed to sensing means. For example, the cells 108 and 110 may include respective light sources as well as the actual sensing device, all located in the plate 19 and adapted to detect the presence of a dropped card by reflection. Alternatively, the light sources alone may be located in the plate 19, while the sensing devices may be positioned opposite and spaced therefrom. In the latter case, a card is detected when the light beams are interrupted.

Figure 2:
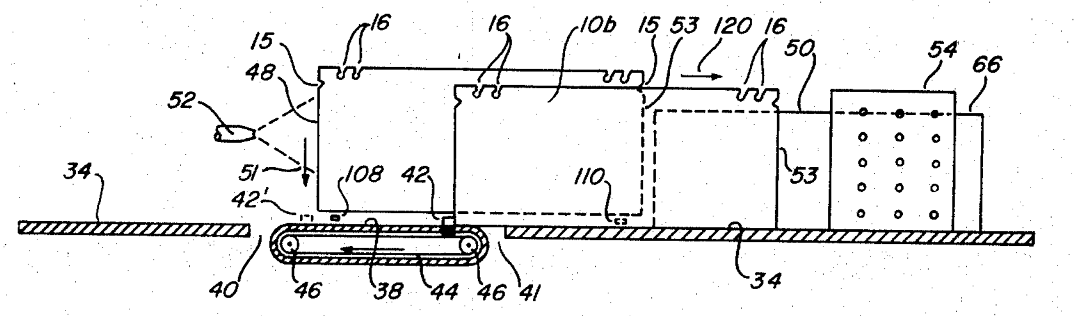
FIGURE 2 illustrates in elevation view pertinent portions of the apparatus of FIGURE 1 and its operation.
Figure 3:
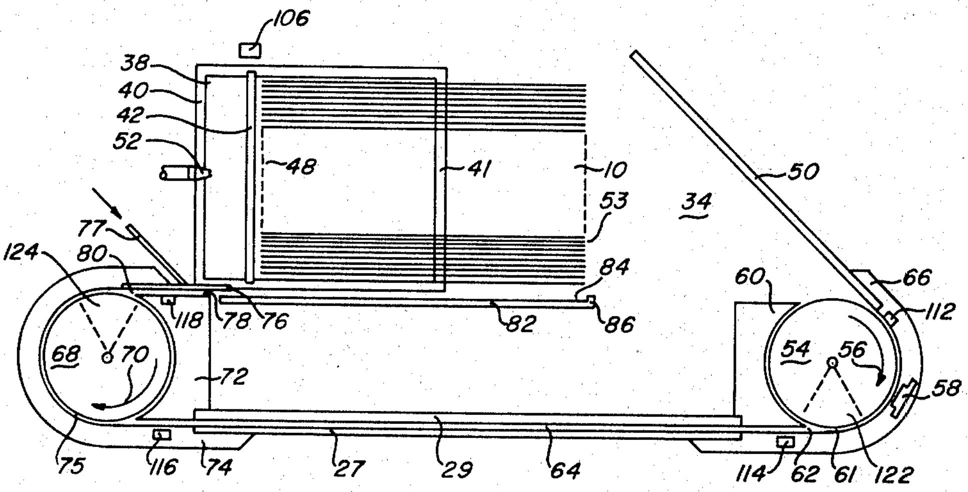
FIGURE 3 illustrates in plan view the apparatus of FIGURE 2.
Figure 4:
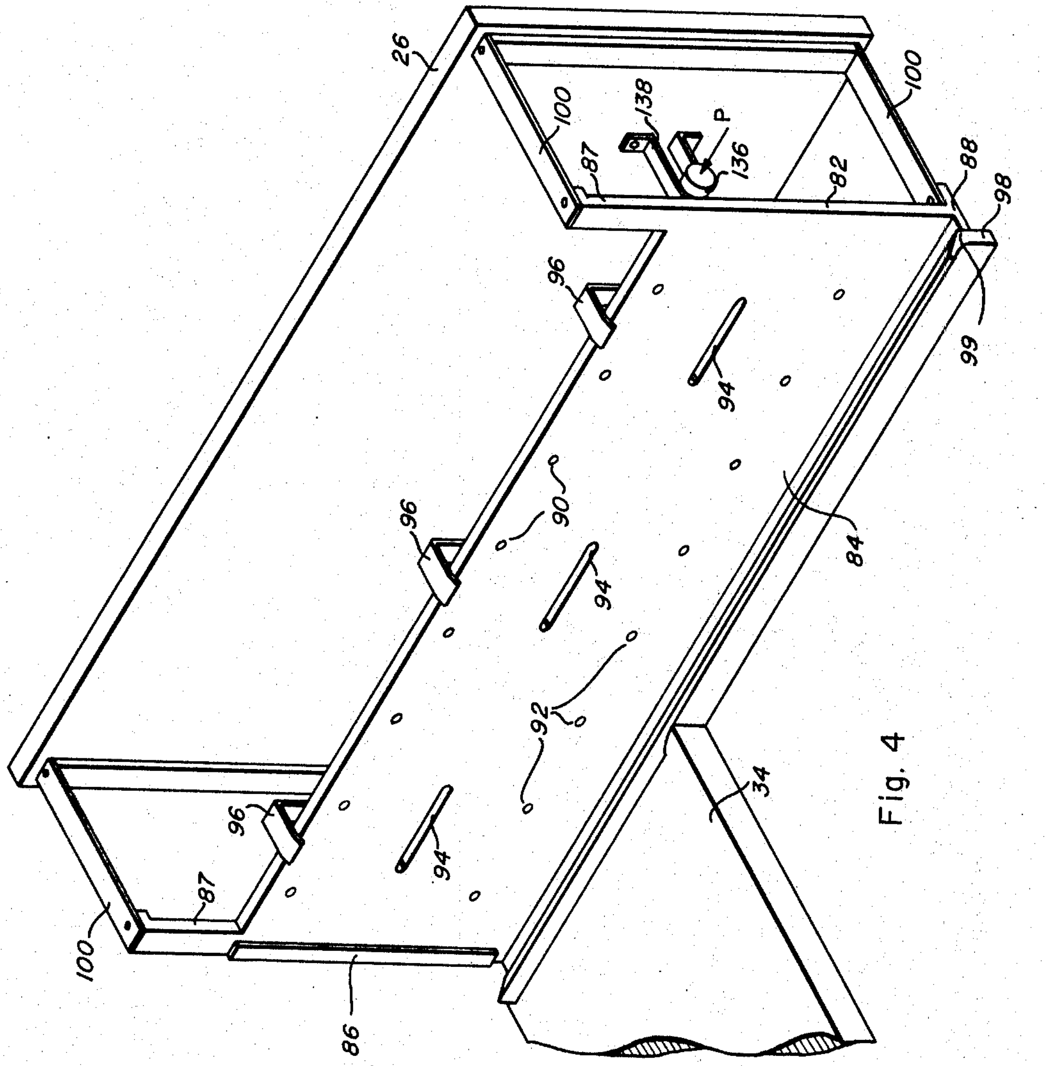
FIGURE 4 illustrates one view of a preferred embodiment of the present invention.
Figure 5:
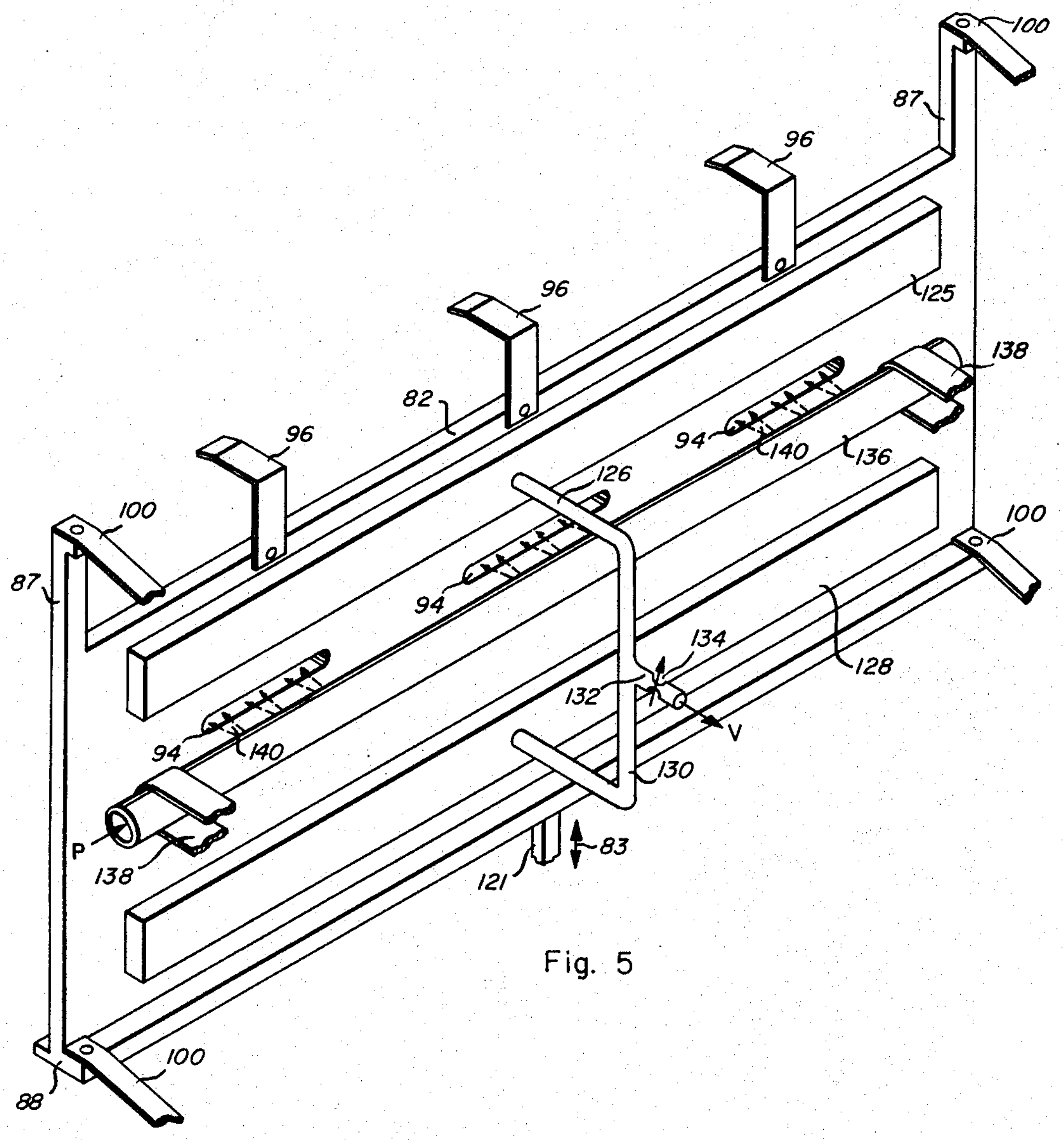
FIGURE 5 is a rear view of the apparatus of FIGURE 4.

As best shown in FIGURE 2, a waiting platform 38 includes a planar portion that lies in the aforesaid reference plane. The platform 38 constitutes a surface that closes on itself and is seen to be spaced lengthwise from the working surface 34, as indicated at 40 and 41. The width of the platform is such that it spans the entire stack of cards suspended thereabove. An impelling bar 42 spans the width of the platform 38, as best shown in FIGURES 1 and 3, its height permitting it to pass below the edges 36 of the suspended cards. The impelling bar is fastened at each end to one of a pair of belts 44 which run on a pair of pulleys 46.

A servo motor 49 is adapted to drive the pulleys in the direction shown to cause the impelling bar 42 to traverse the length of the platform 38, using the latter as a guide. At the end of the platform, the impelling bar passes through the space 41 and, as part of a single continuous action, it returns below the platform through the opposite space 40 to its original start or rest position. The latter is shown in FIGURES 1 and 3 and is further indicated at 42' in FIGURE 2. The start position is accurately determined by the operation of a servo motor 49 which may itself be controlled from a servo circuit. The rest position of the bar 42 is seen to be immediately in front of the minor card edges 48. A photocell 106 is positioned to detect the presence of the bar 42 in the rest position.

As previously explained, in actual practice the cards are stacked far closer than can be faithfully represented in the drawings. In order to prevent their clinging together, an air current may be applied from a nozzle 52, positioned as shown in FIGURE 2. The nozzle may be stationary, or it may reciprocate in order to keep the cards from becoming bunched at the limits of the card deck. These limits are defined at one end by the aforesaid plate 19 and at the other end by a mechanical gate whose function is explained in detail below.

A guide 50 is positioned substantially normal to the working surface 34 and presents a guide surface extending between the card deck 10 and a vacuum read capstan 54. The external surface of the read capstan 54 is seen to contain perforations through which a vacuum may be applied internally of the capstan in order to retain a card in contact with the external surface. The read capstan is adapted to rotate at a constant speed in the direction of the arrow 56, so as to transport a card held in contact therewith past a data transfer station 58 at a predetermined velocity. In a preferred arrangement, the data transfer station includes a plurality of magnetic heads, each adapted to confront a different track of the aforesaid magnetizable card surface.

The surface of the guide 50 which is presented to the cards is continued in a guide structure 66 which abuts the guide 50. A photocell 112 is positioned on the guide structure 66 and is adapted to detect the arrival of a card at the read capstan. The guide structure 66, together with an additional guide structure 60, present curved surfaces to the read capstan 54, to form an internal raceway 61 in cooperation with the external read capstan surface. An external raceway 64 is formed by a pair of closely spaced, parallel guide plates 27 and 29. A card designated **10*d* is shown positioned in the latter raceway in FIG- URE 1. The plates 27 and 29 continue the surfaces of the internal raceway 61. The intersection between the raceways 61 and 64 is formed by a rounded ridge 62. A photocell 114 is positioned on the guide structure 66 to detect the departure of a card from the read capstan. A photocell 116 is positioned along the raceway 64, a predetermined distance downstream from the cell 114** and is adapted to detect the presence of a card at that point.

The raceway surfaces of plates 29 and 27 are continued by a pair of guide structures 72 and 74 respectively. The last-mentioned guide structures form an internal raceway 75 with the external surface of a vacuum return capstan 68. The capstan 68 is similarly constructed to retain a card on its external surface by the application of vacuum pressure and is adapted to rotate in the direction of the arrow 70, at a constant speed which is less than the speed of the read capstan 54 in a preferred arrangement. A plate 76 forms an external raceway 78 with the aforesaid guide structure 72, a rounded ridge 80 being positioned at the intersection of the raceways 75 and 78. An air conduit 77 extends through the plate 76 such that an air jet may be directed into the raceway 78. A photocell 118 is positioned on the guide structure 72 and is adapted to detect the presence of a card in the raceway 78. It will be noted that the aforesaid guide structures, particularly those defining the internal raceways, do not reach to the height of the notches 16 of the card **10*d***. The reason for this construction will become apparent in connection with the discussion below of the operation of the apparatus shown in FIGURES 1 to 3.

FIGURE 4 to 7 illustrate a preferred embodiment of the present invention. A lift plate 82 has a surface 84, which is aligned with one surface of the raceway 78, as appears from FIGURES 1 and 3. The plate surface 84 is substantially normal to the reference plane and is parallel to the suspended cards of the deck 10. The lift plate includes a backstop 86, as well as a pair of extension arms 87. The plate further includes a shelf 88, normal to the surface 84. The lift plate is supported on two pairs of flexures 100, fastened to the arms 87 and to the rear portion of the shelf 88, at opposite sides of the plate. The flexures are further attached to a pair of shoulders of the stationary plate 26 and permit motion of the lift plate substantially in the direction of the arrow 83. When a force is selectively applied to an extension 121 of the plate, suitable sensing means may be provided to detect the position of the plate 82 relative to the working surface 34. When the lift plate is in its normal position, as shown in FIGURE 7A, the shelf 88 is seen to lie in the working surface 34 and is coplanar therewith.

The plate 82 includes a series of aligned apertures 94, positioned between an upper and a lower row of holes 90 and 92 respectively. Each of the holes 90 has a relatively small orifice opening onto a common reservoir 123 and a larger working area opening onto the plate surface 84. Similarly, each of the holes 92 has an orifice opening onto a common reservoir 127 and a larger working area opening onto the surface 84. In a preferred embodiment of the invention, the working areas of all the holes opening onto the plate surface 84 are identical. The reservoir 123 is defined by the rear surface of the plate 82 and a cover 125 mounted thereon. A flexible conduit 126 communicates with the reservoir 123 through the wall of the cover 125.

A cover 128 is mounted on the rear surface of the plate 82 and defines the reservoir 127 therewith, behind the row of holes 92. A flexible conduit 130 communicates with the reservoir 127 and jointly terminates with the conduit 126 in a common flexible vacuum supply line 132. As indicated by the arrow, the supply line 132 includes a variable restriction 134, e.g. an adjustable needle valve. The supply line communicates with a source of vacuum pressure, as indicated by the designation V in the drawings.

A pipe 136 is mounted on the stationary plate 26 by means of suitable strapping 138. The pipe communicates with a source of positive air pressure, as indiacted by the arrow and the designation P and is closed at the other end. The pipe 136 further contains suitable orifices adapted to blow jets of air 140 through orifices 94 when the latter are positioned opposite the pipe 136.

A series of hook-like structures 96 extend above the upper plate edge and jointly define the upper lip of the above-mentioned mechanical gate. The lower lip 98 of the aforesaid gate faces the lip 96 and is positioned above the reference plane in fixed relationship to the latter. The forward portion of the lip 98 is concave to accommodate the traversing impelling bar 42, as explained below. The rear of the lip 98 includes an elbow 99. Lips 96 and 98 respectively, converge in a direction away from the plate 82 and terminate abruptly in a common vertical plane. In the raised position of the plate 82, shown in FIGURE 7B, the mutual spacing of the lips 96 and 98 in the common vertical plane is slightly less than the height of a card.

In order to place the present invention in its proper context, the operation of the apparatus shown in FIGURE 1–3 will first be explained. A desired card deck 10 is placed in position by sliding the support structure 28 in the direction of the arrow 30, as permitted by the roller and rail arrangement 33 and 35. With the deck held in place in the position shown in FIGURE 1, i.e., with the lower card edges 36 spaced above the reference plane, the carriage 28 is slid forward, causing the selection rods 14 to engage the upper card notches 16 and the holding rods 12 to engage the notches 15 in the minor card edges. An air jet applied from the nozzle 52 to the minor card edges 48, tends to keep the cards separated from each other. The plate 19 and the lips 96 and 98, which terminate in the aforesaid common vertical plane, define the limits within which the stacked cards may be positioned. As previously explained, the width of the platform 38 spans the distance between these limits.

A card may now be randomly selected from the deck by energizing the solenoid actuators 18 in accordance with the address code of the selected card. The aforesaid code may, for example, be derived from the central processor of the data processing system with which the subject card processing apparatus is associated. The energized actuators 18 rotate the selection rods 14 so as to free the selected card. At this time the actuators 20 are also energized to turn the holding rods 12. The selected card drops in the direction of the arrow 51 onto the reference plane. In this position the card straddles the space 41. As previously explained, the lower card edges 36 of the suspended cards are positioned close to the reference plane, a distance sufficient only to permit the impelling bar 42 to pass underneath without interference. Accordingly, the distance of free-fall drop of the card **10*a* is relatively small with respect to the card height, being of the order of ¼ inch in one practical embodiment of the present invention. As seen from FIGURE 1, the selected card 10*a* is supported against tipping by its immediately adjacent suspended cards. The trailing edge 48 of the card 10*a* is positioned immediately in front of the impelling bar 42** in the rest position of the latter.

With the card **10*a* in position as shown in FIGURE 1, the servo motor 48 is energized and the impelling bar 42 rapidly traverses its prescribed path, as determined by the platform 38. Specifically, the bar 42 is accelerated in the forward direction from its rest position and initially moves above the waiting platform 38. During this portion of its travel, one end of the bar is positioned immediately adjacent the conforming concave portion of the lower lip 98. Subsequently the bar 42 moves through the opening 41 and returns below the platform in the opposite direction, until it rises through the opening 40 and comes to rest again in its initial position above the waiting platform. The forward motion of the impelling bar above the platform 38 is imparted to the dropped card which is accelerated in the direction of the arrow 120, as illustrated with respect to the card designated 10b in FIGURE 2. The card acceleration is substantially linear and is effected without damage to the trailing card edge 48 which is positioned immediately adjacent to the bar in the rest position of the latter. It will also be noted that, since the dropped card straddles the space 41, the forward portion of the card is already positioned on the working surface 34 at the time the card acceleration is initially applied. Accordingly, the leading card edge 53 cannot snag even if the waiting platform 38 and the working surface 34** are not precisely coplanar.

The attitude of the accelerated card 10b thus remains substantially perpendicular to the reference plane, as the card moves with its lower edge 36 in contact with the latter plane. The air current applied by the nozzle 52 provides the necessary air film between adjacent cards to serve as a bearing therebetween so as to avoid damage to the sensitive card surface. After the impelling bar 42 reaches the extreme position of its forward path, the accelerated card continues in the same direction under its own momentum. The card changes direction as the leading edge 53 reaches the surface of the guide 50. From a consideration of FIGURE 3, it will be clear that the point in time when the leading card edge reaches the guide 50 will vary in accordance with the position of the selected card in the deck, the cards closest to the lift plate 82 taking longest to arrive at the guide. The sensitive, magnetized surface of the card never makes physical contact with the facing surface of the guide 50. This is due to the fact that sufficient air is drawn between the guide surface and the card to provide an air bearing that is adequate to support the card until it reaches the capstan 54.

When the card arrives at the rotating read capstan 54 it is further accelerated owing to the greater surface speed of the capstan. The card is, however, held in contact with the external capstan surface due to the vacuum pressure applied through the apertures in the latter surface. The card is thus transported past the data transfer station 58, where information is either read into, or out from, a specified track on the magnetized card surface facing the data transfer station. A data transfer is preferably carried out with respect to only a single track on each pass of the card past the station 58. The card is retained on the capstan for as many revolutions as there are tracks to be read or written into.

As previously explained, the card extends sufficiently above the guide structures so that the notches 16 make no physical contact with the latter. This is particularly important when a card is on one of the rotating capstans where the centrifugal force tends to flex the card outward in the vicinity of the notches 16. Such outward flexing is difficult to prevent by the use of vacuum pressure alone, because the slots 16 have a tendency to dissipate the vacuum in this area. By letting the card extend above the guide structures, however, the possibility of damage to the notch area of the card is avoided.

While the details of the internal construction of the read capstan are beyond the scope of the present discussion, it is sufficient to state that a gating action is provided whereby vacuum pressure may be selectively withdrawn from a sector 122 of the external capstan surface, in the vicinity of the ridge 62. The control of vacuum pressure in this area may, for example, be effected through the aforesaid central processor of the associated data processing system and may depend on the nature of the information read out at the data transfer station which is sent to the central processor. For example, the data read out from one track may cause the central processor to issue read commands with respect to other tracks of the same card. When the card is to be released, the command is given by the central processor to withdraw vacuum pressure from the aforesaid sector 122 of the external read capstan surface. The leading card edge, once it enters the sector 122, is therefore no longer retained in contact with the external read capstan surface. Its own flexibility and centrifugal force action thus cause the card to enter the external raceway 64 and to travel along the latter under its own momentum, imparted to it by the read capstan 54.

Since the card contacts the read capstan with its non-sensitive surface, the magnetized card surface is subject to physical contact only by the magnetic heads of the data transfer station 58 while the card is on this capstan. An air bearing exists in the raceway 64 which similarly prevents aggressive physical contact with the sensitive card surface. This effect may be enhanced by providing openings in the guide plate 27 through which air may be drawn in.

The return capstan 68 preferably rotates at a constant surface speed, approximately one-half that of the read capstan. Thus, the card arriving by way of the raceway 64 is decelerated, but is held in contact with the external capstan surface owing to the application of vacuum pressure internally of the capstan 68. The vacuum pressure is preferably permanently withdrawn from the return capstan sector 124, so that the card passes directly from the internal raceway 75 to the external raceway 78. It will be clear, however, that the gating action discussed in connection with the read capstan 54 may also be implemented here if it is desired to retain a card on the return capstan for more than one revolution.

The aforesaid capstan gating actions are determined in part by signals derived from the central processor and in part by the condition of the card path. For example, it may be necessary to retain a card on the read capstan 54 for several revolutions in order to read out successive data tracks, one track at a time. Similarly, it may be desired to retain a card on the return capstan 68, for example, when a preceding card in the card path has not reached the stack. The signals which indicate the status of the card in the transport are derived from the aforementioned sensing means, such as the photocells 108, 110, 112, 114, 116, 118, which are capable of sensing the presence of a card, or from the photocell 106, which senses the presence of the impelling bar in its rest position.

The application of an air jet through the pipe 77 to the card emerging from the internal raceway 75, assures that the card arrives at the lift plate 82 parallel to the plate surface 84. It further prevents damage to the sensitive card surface in the raceway 78. Once the card has traversed the latter, it arrives under its own momentum at the lift plate surface 84, at a speed of the order of 300 inches per second.

The lift plate 82, which is a component part of the return mechanism that forms the subject matter of the present application, functions to decelerate and stop the linear motion of the arriving card 10c in the direction of the arrow 131 at a precisely predetermined point, i.e. at a point where the card notches 16 line up with the projections of the selection rods 14. This action must occur in a very brief time interval, 35 milliseconds in a practical embodiment of the invention, and without letting the leading edge of the car strike the emergency backstop 86. As pointed out above, such impacting is undesirable since it can damage the card and because it produces a card rebounding action which must be permitted to settle before the lifting action of the plate 82 can be initiated. The lifting action, in a direction substantially normal to the reference plane, must rapidly bring the card notches 16 into precise registry with the selection rods 14, the notches 15 simultaneously coming into registry with the holding rod 12. Thereafter, motion must be imparted to the card substantially at right angles to both the direction of arrival and the card lifting action, to return the card to the rods. In essence, the card leaving the raceway 78 must successively undergo three mutually perpendicular translational movements in a time interval of the order of 80 milliseconds, before it is again suspended in the stack 10.

Vacuum pressure is constantly applied, by way of the restriction 134, to the common supply line 132 and is communicated to the reservoirs 123 and 127 through the conduits 126 and 130 respectively. The applied vacuum results in an air flow through the holes 90 and 92 and through the conduits back to the source of vacuum pressure V. See FIGURE 6. Simultaneously, positive air pressure P is constantly applied to the pipe 136, causing air jets to issue from the pipe orifices. In the position of the plate 82 that is illustrated in FIGURE 7A, the orifices of the pipe 136 are out of registry with the apertures 94, so that the air jets 140 are dissipated by the rear surface of the plate 82.

Figure 6:
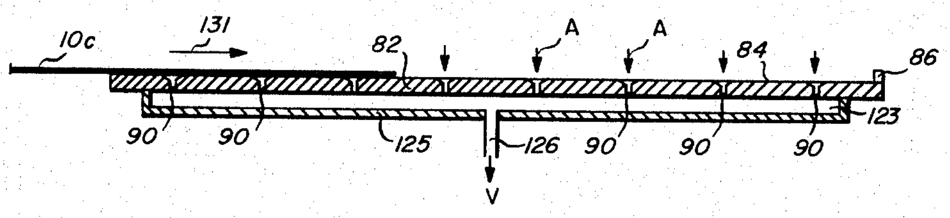
FIGURE 6 illustrates in cross-sectional view a portion of the apparatus shown in FIGURES 4 and 5.

As the arriving card 10c covers up successive holes 90 and 92 in the plate surface 84 during its movement in the direction of the arrow 131, as shown in FIGURE 6, there is a decrease of the total air flow A resulting in a smaller pressure drop across the common restriction 134. Assuming the vacuum applied by the vacuum pump to remain constant throughout, the vacuum pressure in the reservoirs 123 and 127 increases as successive holes are covered. The force with which the moving card 10c is urged into frictional contact with the plate surface 84, which causes the card to be decelerated, is the product of the working area of the covered holes and the pressure differential between ambient atmospheric pressure and the vacuum pressure inside the reservoir. Accordingly, the step-increase in the decelerating force acting on the arriving card as successive holes are covered is non-linear, because the vacuum pressure within the reservoirs—and hence the pressure differential—increases as each pair of holes is reached by the card.

The common reservoir which communicates with each row of holes serves to equalize the vacuum pressure. Thus, in FIGURE 6 the action of the reservoir 123 causes the three holes which are shown covered up by the card 10c to apply equal holding forces to the card, all the holes having identical working areas in the plate surface 84. As the fourth hole is covered by the card moving in the direction of the arrow 131, the vacuum pressure in the reservoir increases and identical holding forces are exerted by the first four holes which are, however, individually greater than those exerted when only three holes were covered. Thus, when all the holes are covered, force is uniformly applied to the card to retain it in contact with the plate surface 84.

It will be clear from the foregoing explanation that, in order for each hole to act on the card with the same force, the working areas of all holes must be identical. In general, it is desirable for the orifice of each hole to be small relative to the working area. This prevents the air flow from being excessive and reduces the demand on the vacuum pump. The deceleration of a card described above may not meet the requirements of a particular situation. For example, it may be desirable to apply a large amount of decelerating force to the card 10c when it initially arrives and to taper off the step increases of the holding force in order to exert a finer control over the ultimate position of the arrested card. One suggested solution is to cluster the holes on the side of the lift plate which is first engaged by the arriving card. Another way of solving the problem is to vary the size of the hole orifices. Thus, if the hole orifices on the left-hand side of the lift plate 82 in FIGURE 6 are relatively large compared to those at the right, a large increase of the vacuum pressure in the reservoir 123 is initially experienced, resulting in a large initial decelerating force applied to the card. The covering up of holes having small orifices toward the right-hand end of the plate will decrease the existing air flow by relatively small amounts and hence the card holding force will only be slightly increased.

The above-discussed parameters are, of course, fixed with respect to a given lift plate. With a given arrangement, the variable restriction 134 serves to provide selective overall control. Thus, if it were found that the arriving card is arrested short of its final position, a needle valve controlling the restriction 134 could be closed down somewhat to decrease the total decelerating force acting on the card, without altering the manner in which this force is applied. Alternatively, if the arriving card tends to bounce off the backstop 86, opening the needle valve will produce a larger card decelerating force to arrest the card earlier, at a precisely determined point.

Since the sensitive card surface never makes contact with the lift plate 82, no damage is sustained during card deceleration, which requires the application of a large frictional force to the rear surface of the card. Further, the relatively sensitive card notches extend above the lift plate and, hence, they are similarly free from aggressive frictional action on the part of the plate. As previously explained, the card travels edgewise in the reference plane, which is determined by the working surface 34 and the waiting platform 38. In the normal position of the lift plate, which is illustrated in FIGURE 7A, the top surface of the forward portion of the shelf 88 is coplanar with the working surface 34. The card thus moves onto the shelf 88. After all motion in the direction of the arrow 131 has been dissipated, the differential pressure between atmosphere and the continuously applied vacuum serves to hold the card against the plate surface 84, the lower card edge being in contact with the shelf 88. Each card notch is now positioned in the same vertical plane as its corresponding rod.

Unless another card is in the process of being selected, it is generally desirable to return a card arriving at the lift plate 82 immediately to the stack 10. The command to commence the lifting action of the plate 82 may be derived from a signal obtained from the photocell 118, since the elapsed interval between the point in time when the leading card edge passes the cell 118 and the point in time when it reaches its final position on the plate surface 84 is accurately predictable. In order to speed up the operation, the lifting action may be initiated before the card has reached its final position on the plate surface 84, provided card motion in the direction of the arrow 131 has ceased before the lift plate has completed its upward movement. The reservoirs 123 and 127 move with the lift plate, such motion being permitted by the flexible conduits 126, 130 and 132. Thus, the holding force applied to the card through the plate surface 84 remains constant as the lift plate begins its rise.

Figure 7B:
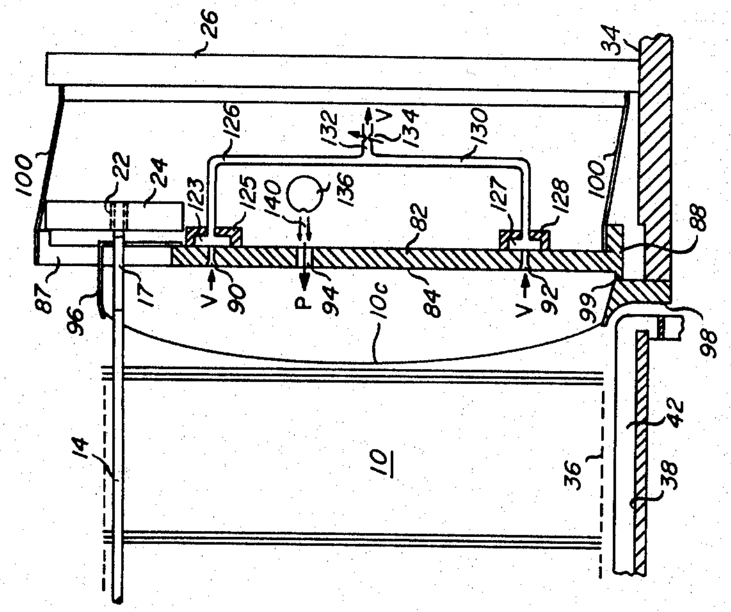
FIGURES 7A and 7B illustrate the operation of the apparatus of FIGURES 4 and 5.
Figure 7A:
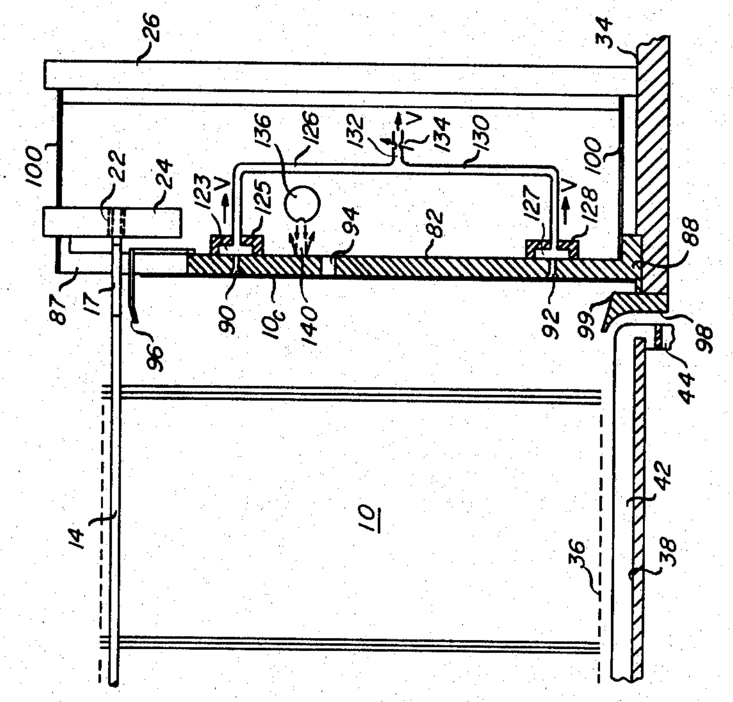

The lifting action is effected by applying a force in an upward direction to the plate extension 121, as shown by the arrow 83. The lifting means, which form no part of the present invention, have been omitted for the sake of clarity. The action of the leaf springs 100, which are anchored at one end to the stationary plate 26, guides the motion of the lift plate in a direction substantially normal to the reference plane. At the extreme upward plate position, which is illustrated in FIGURE 7B, the hook-like structures 96 pass between the selection rods 14 and extend above the latter. The card 10c is now positioned opposite the suspended cards of the deck 10, the card notches 16 engaging the aforesaid relieved portions 17 of the selection rods 14. While not shown in FIGURE 7B, the card notches 15 similarly engage the relieved portions of the holding rods 12 at this time. In this position of the plate 82, which may be approximately ¼ inch above its normal position in a practical embodiment of the invention, the upper surface of the shelf 88 is on the level of the lip elbow 99.

The pipe 136, being attached to the plate 26, is stationary and is seen to be positioned above the apertures 94 in the normal position of the lift plate, as shown in FIGURE 7A. As the plate rises to the position shown in FIGURES 5 and 7B, the apertures 94 come into registry with the pipe 136. The previously dissipated air jets 140 issuing from the pipe orifices now pass through the apertures 94 and are directed against the rear surface of the card, as indicated by the arrow P in FIGURE 7B. The positive air pressure thus applied to the rear surface of the card 10c is sufficient to overcome the force with which the card is held against the plate surface 84 by the uniform application of vacuum pressure through the holes 90 and 92. The card 10c now leaves the plate surface 84 in a uniform manner, as determined by the uniformly distributed forces acting on the rear surface thereof and moves toward the suspended cards 10c. The shelf 88 prevents the card from dropping vertically.

Since the upper surface of the shelf 88 is at the height of the lip elbow 99, the card moving in the direction of the arrow P in FIGURE 7B now encounters the constriction of the mechanical gate that is formed by the lips 96 and 98. The positive air pressure bows the flexible card 10c in the direction of the suspended cards 10, sufficiently to cause the upper and lower card edges to pass through the gate. The applied air pressure P continues to act on the card after the gate is passed to blow the card further onto the rods 14, away from the relieved rod portions. With the card back in the deck 10, a complete card cycle has been completed.

Although the invention has been described in connection with a specific card processing system, it will be recognized that it is not so limited and that it may find application wherever a card or strip-like document must be translationally transported in successive, mutually perpendicular directions. As previously pointed out, different operating parameters may be obtained by varying the size of the hole orifices, or by varying the spacing of the holes in the direction of the arriving card, or both. The arrangement of the holes is not limited to a pair of rows as shown, nor is the arrangement of the apertures 94 limited to a series of aligned slots. For example, the working areas of the vacuum holes may be in the form of vertical, adjacent slots, aligned in a single row centrally of the plate. In this case, only a single reservoir is required. In the illustrated preferred embodiment, it is also possible to have each reservoir served by a separate restriction in the connected conduit before the conduits are returned to the vacuum pump. In such an arrangement, however, the same holding force must be applied by the holes of the separate rows. Variations are also possible in the size of the reservoir associated with each row of holes. It will be clear that, as the size of the reservoir decreases, the covering up of each hole will produce a proportionately greater effect on the existing vacuum pressure conditions. As a consequence, the deceleration of the card, although more distinctly stepwise, will occur more rapidly as each hole is covered. On the other hand, an increase in the size of the reservoir will produce a slower response, since the effect of covering a single hole is proportionately smaller. Since the step increases are now smaller, the response will also be more linear.

From the foregoing disclosure of the present invention it will be apparent that numerous modifications, departures, substitutions and equivalents will now occur to those skilled in the art, all of which fall within the true scope and spirit contemplated by the present invention.

What is claimed is:

1. Transport apparatus for card-like records, comprising a plate movably disposed between a pair of limits, said plate having a surface positioned to make parallel sliding contact with a traveling record, a plurality of holes in said surface successively spaced at least in the direction of record travel, at least one reservoir communicating with said holes, means for applying vacuum pressure to said reservoir, said vacuum pressure being adapted to apply a decelerating force of increasing magnitude to said record through frictional contact between the latter and said plate surface as successive holes in said surface are covered by said traveling record when said plate is positioned at one of said limits, said vacuum pressure being effective to arrest said record at a predetermined point on said plate surface, and means for selectively moving said plate to the other one of said limits to impart translational motion to said arrested record in a direction substantially normal to said direction of record travel.

2. The apparatus of claim 1 wherein said reservoir is mounted on the rear of said plate, each of said holes including a working area opening onto said plate surface and an orifice communicating between said working area and said reservoir, the diameter of said orifice being smaller than said working area.

3. The apparatus of claim 2 and further including conduit means communicating between said reservoir and a constantly operative source of vacuum pressure, and an adjustable restriction in said conduit means.

4. The apparatus of claim 2 wherein said holes have identical working areas.

5. The apparatus of claim 4 wherein said holes are equally spaced in said direction of record travel, the orifices of successive holes in said direction decreasing in diameter.

6. The apparatus of claim 4 wherein the mutual spacing of successive holes increases in said direction of record travel.

7. The apparatus of claim 1 and further including at least one aperture piercing said plate, stationary record removal means positioned behind said plate in registry with said aperture only when said plate is positioned at said other limit, said last-recited means being operative through said aperture to move said record off said plate in a direction substantially normal to both said direction of record travel and said direction of translational motion.

8. The apparatus of claim 7 wherein said vacuum pressure is effective to retain said record on said plate surface, said stationary record removal means including means for directing a jet of positive air pressure at said plate, said jet being effective, when said aperture is in registry therewith, to force said card off said plate surface against the action of the applied vacuum pressure.

9. Transport apparatus for record cards, comprising a reference plane, a plate having a planar surface normal to said plane, said plate being positioned to make sliding contact with a card traveling edgewise along said plane, a plurality of holes in said plate surface arranged in at least a pair of spaced rows parallel to said reference plane, a reservoir common to each row and communicating with the holes thereof, said reservoirs being mounted on the rear of said plate, flexible conduit means communicating between said reservoirs and a source of constant vacuum pressure, said vacuum pressure being effective through said holes to apply a decelerating force of increasing magnitude to said traveling card as successive holes are covered by the latter, said vacuum pressure being further adapted to arrest said card at a predetermined point on said plate surface and to retain it in contact with the latter, a plurality of apertures piercing said plate, said apertures forming a row parallel to said rows of holes and positioned therebetween, means for selectively lifting said plate in a direction substantially perpendicular to said plane, a stationary pipe positioned behind said plate and including a plurality of orifices, means for constantly applying positive air pressure to said pipe to issue air jets at said orifices, said pipe being positioned such that said jets are in registry with said apertures only when said plate is lifted to its extreme upward position, the positive air pressure applied through said apertures to the rear of said retained card being adapted to overcome the applied vacuum pressure to force said card off said plate surface.

10. The apparatus of claim 9 and further including a common variable restriction connected in series with said source of vacuum pressure.

11. The apparatus of claim 9 wherein pairs of cantilevered flexure springs are fastened to opposite sides of said plate with one end of each spring, the other end of each of said springs being fastened to a stationary point, said springs inhibiting motion of said plate in any direction other than in a direction normal to said reference plane.

12. The apparatus of clam 9 wherein each of said holes includes a working area opening onto said plate surface and an orifice communicating between said working area and the corersponding reservoir, the diameters of said working areas being substantially identical, each being large with respect to the diameter of the corresponding orifice.

13. The apparatus of claim 12 wherein said holes are equally spaced in each of said rows.

14. The apparatus of claim 9 wherein said records are normally positioned at a storage location, and further including a constriction interposed in the path of said record between said plate surface and said storage location, the net positive air pressure applied to a record forced off said plate surface being adapted to bow the latter flexibly in the direction of said storage location sufficient to pass through said constriction.

15. The apparatus of claim 9 wherein said records are normally positioned at a storage location, and further including a constriction interposed in the path of said record between said plate surface and said storage location, said constriction comprising a first lip affixed to said reference plane in parallel relationship therewith and gradually rising in the direction of said path, a second lip affixed to the top of said plate and being movable therewith, said second lip being parallel to said first lip and gradually approaching the latter in the direction of said path, said lips abruptly terminating in a common plane normal to said reference plane and defining a space therebetween, when said plate is in its extreme lifted position, sufficient to permit a record forced off said plate surface by the net positive pressure applied thereto to pass through said space by flexibly bowing in the direction of said storage location.

16. The apparatus of claim 15 wherein said first lip further includes an elbow positioned above said reference plane, said gradual rise commencing above said elbow, said plate further including a shelf extending perpendicularly forward of said plate surface and being normally coplanar with said reference plane, said shelf being located at the height of said elbow when said plate is in its extreme lifted position.

17. The apparatus of claim 9 wherein said cards are normally suspended on a set of rods positioned above said reference plane and parallel thereto, said rods engaging corresponding notches in each suspended record, the notches of said retained card extending above said plate and engaging said rods when said plate is lifted to said extreme position, the net positive air pressure applied to said card being effective to blow said card further onto said rods away from said plate.

18. Transport apparatus for card-like records, comprising a reference plane, a plate having a planar surface normal to said reference plane positioned to make sliding surface contact with a record traveling in a first rectilinear direction in edgewise contact with said plane, a plurality of holes in said plate surface mutually spaced at least in said first direction, at least one aperture piercing said plate, means including at least one common reservoir for applying vacuum pressure to said holes from the rear of said plate, said vacuum pressure applying a decelerating force of increasing magnitude to said traveling record as successive holes in said plate surface are covered adapted to arrest said record at a predetermined point on said plate surface and to retain it in contact therewith, means for lifting said plate from its normal position to an upper limit in a manner adapted to impart translational motion to said retained record in a second rectilinear direction substantially perpendicular to said first direction, stationary means for directing at least one jet of positive pressure to the rear of said plate, said jet being in registry with said aperture only when said plate is at said upper limit, the positive pressure applied to the rear of said retained card being adapted to overcome the applied vacuum pressure to force said card away from said plate surface and to impart translational motion thereto in a third rectilinear direction substantially perpendicular to said first and second directions.

References Cited

UNITED STATES PATENTS

| | | | |
|---|---|---|---|
| 2,538,972 | 1/1957 | Magnani | 271—74 X |
| 2,867,438 | 1/1959 | Hori | 271—74 |
| 2,969,980 | 1/1961 | Claybourn | 271—68 |
| 3,108,352 | 10/1963 | Haigler et al. | 193—32 X |
| 3,123,354 | 3/1964 | Ungerer | 271—74 |
| 3,218,897 | 11/1965 | Geigenmiller et al. | 271—46 X |

M. HENSON WOOD, Jr., *Primary Examiner.*

J. N. ERLICH, R. A. SCHACHER, *Assistant Examiners.*